No. 655,754. Patented Aug. 14, 1900.
J. A. BRILL & W. S. ADAMS.
DIFFERENTIAL BRAKE MECHANISM.
(Application filed Sept. 16, 1897.)
(No Model.) 3 Sheets—Sheet 3.
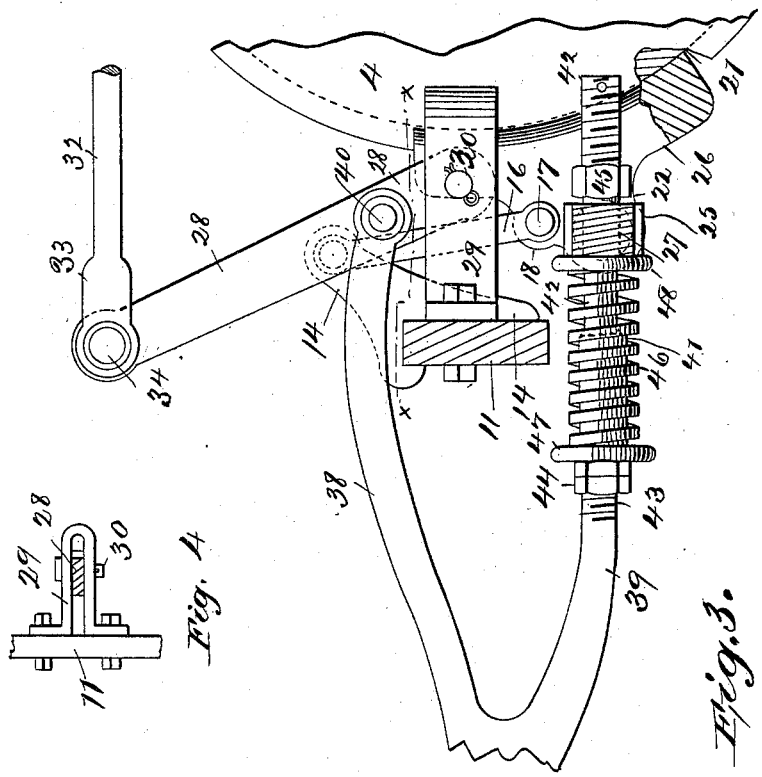
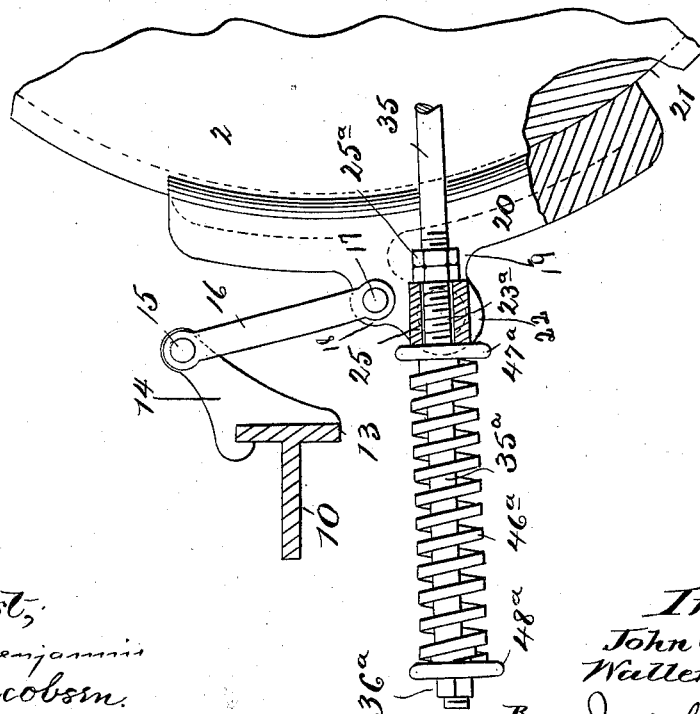
Attest,
C. W. Benjamin
Wm Jacobsen.
Inventors
John A. Brill &
Walter S. Adams.
By Joseph L. Levy
Their Attorney

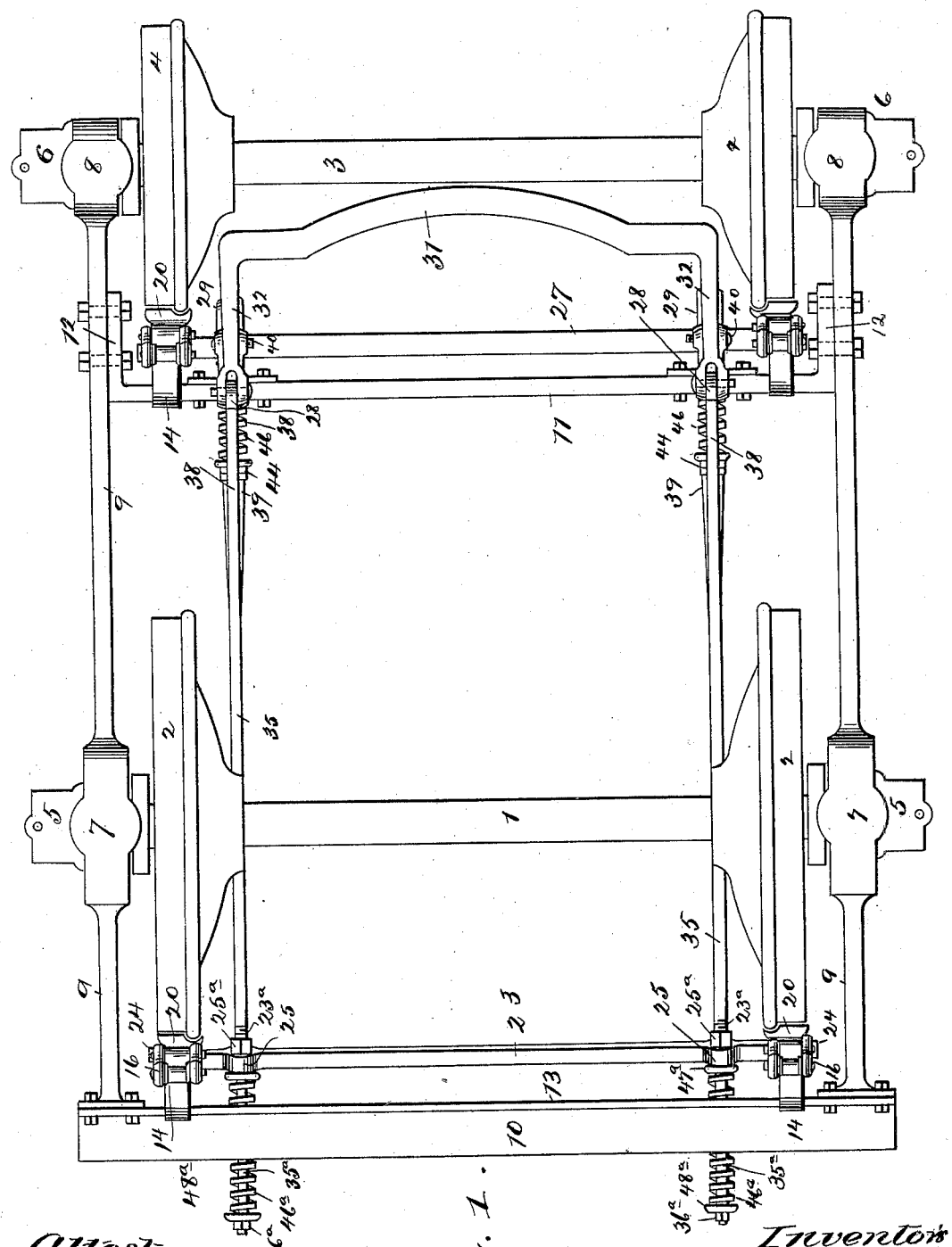

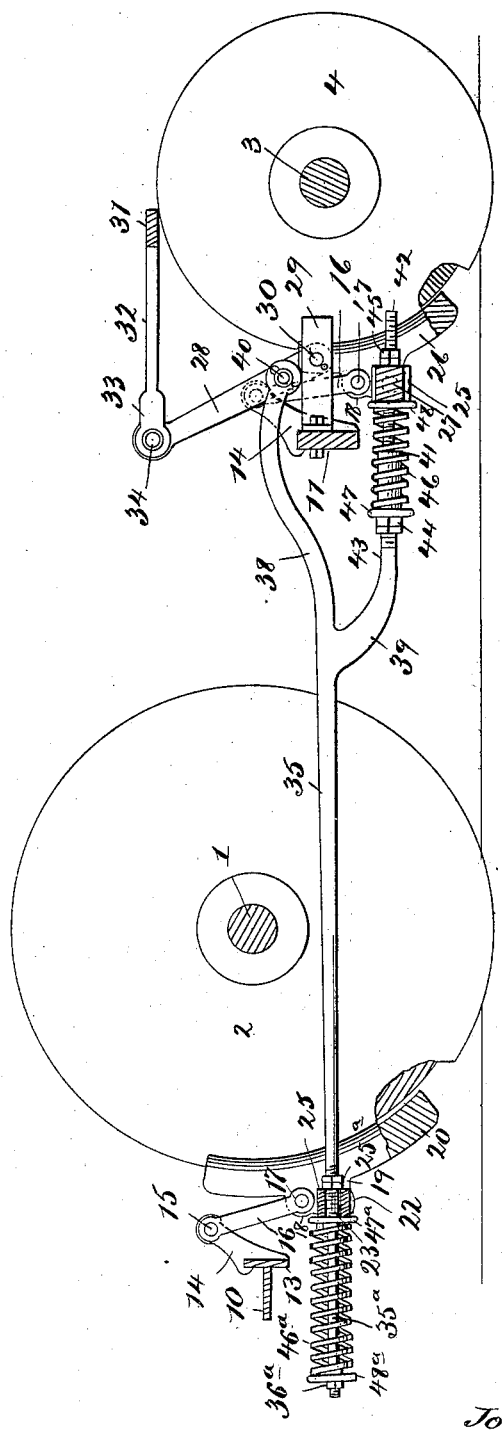

UNITED STATES PATENT OFFICE.

JOHN A. BRILL AND WALTER S. ADAMS, OF PHILADELPHIA, PENNSYLVANIA; SAID ADAMS ASSIGNOR TO SAID BRILL.

DIFFERENTIAL BRAKE MECHANISM.

SPECIFICATION forming part of Letters Patent No. 655,754, dated August 14, 1900.

Original application filed March 3, 1897, Serial No. 625,891. Divided and this application filed September 16, 1897. Serial No. 651,886. (No model.)

*To all whom it may concern:*

Be it known that we, JOHN A. BRILL and WALTER S. ADAMS, citizens of the United States, residing in the city and county of Philadelphia, State of Pennsylvania, have made certain new and useful Improvements in Differential Brake Mechanism, of which the following is a specification.

Our invention relates to brake mechanism for street or other cars; and the subject-matter of the present application relates in part to that of an application filed by us on the 3d day of March, 1897, Serial No. 625,891, of which the present case is a division, which application has become Patent No. 603,723, dated May 10, 1898.

Our invention has for its object to provide in a brake mechanism means whereby the power exerted by the brake mechanism can be graduated during its application to the faces or treads of the wheels of the truck and also to prevent the skidding of the wheels on the track.

One of the special objects of our invention in this regard, as recited in the said application, is to provide means for applying this graduated braking power or force either to what are termed the "trailing" or "guide" wheels or the "driving-wheels," or both, of trucks in which sets of wheels of large and small diameter are employed, the subject-matter of the present application being restricted to the application of the braking power to both sets of wheels and the recited arrangement of the mechanism by which this is accomplished.

Our invention also extends to means for graduating the braking power through the medium of interposed springs when applied to the tread of the large or driving wheels, as recited in said application.

In the above-mentioned class of trucks it has been usual to place the pivotal center of the car and truck approximately over the axle of the larger wheels, so as to preponderate the weight of the car thereon, and thereby increase the traction of the truck, and to this end it has also been the custom to sleeve or otherwise mount the motors on or in communication with the axle of the larger wheels and apply the motive power thereto, in which case the large wheels have been termed the "driving-wheels" of the truck, the smaller wheels being used to allow of the free curving of the truck under the car. In a truck so constituted it has been found in many instances to be exceedingly advantageous to apply a greater braking power to the larger or driving wheels than to the smaller or trailing wheels for the purposes, primarily, of apportioning the braking power applied to the weight superposed on each of the sets of wheels, and, further, for the purpose of arresting the rotation of the wheels nearer to the point where the motive power is applied in preference to simultaneously applying an equal amount of power both upon the driving and trailing wheels.

Other objects had in view by us are to apply the braking power so that the tendency of the smaller or trailing wheels to lift and leave the track during the braking operation will be materially reduced, if not altogether avoided, and to reduce as much as possible the flattening of the tread of the wheels or either set of them, which is due to the skidding of the wheels on the track when the brakes are applied.

With our invention the full braking power may be applied to the tread of the larger or driving wheels and the power applied to the tread of the smaller or trailing wheels through means which produce a graduation of the pressure reduced, so that such power is apportioned on predetermined lines to the weight of the car, &c., that each set of wheels carry, and through the mechanism hereinafter described the grip of the shoes on either sets of wheels is intermittently released, allowing of considerable intermitted rotation of the wheels while the brakes are "on" and preventing the flattening of the tread.

Our invention therefore consists in a brake mechanism in which is introduced means for accomplishing the above-stated ends, the particular means hereinafter shown and described consisting of springs so located in the brake mechanism that either subsequent to or simultaneous with the application of the braking power to one set of wheels said power will be primarily exerted in compressing the spring or springs until the resistance offered by such spring or springs is equal or properly proportioned to the power which it is desired to apply on the wheels with which such springs are intended to coöperate, at which time the full or desired braking power will be applied to the other set of wheels, and one of the specific features of improvement hereinafter recited is the employment of sets of springs of varying or different resisting capacity for opposing the application of the various sets of shoes to the various sets of wheels.

Our invention further consists in the details of construction and in the combination of parts hereinafter described, and further pointed out in the claims.

In the drawings forming part of this specification, Figure 1 is a plan view of the truck equipped with our brake mechanism. Fig. 2 is a sectional elevation taken approximately along the longitudinal center of the truck, the brake mechanism being at rest and parts of the truck omitted for the sake of clearness. Fig. 3 is an enlarged fragmentary sectional elevation of the brake mechanism on the same plane as Fig. 2, showing the manner of applying the brake-shoes to their respective wheels. Fig. 4 is a plan view of a portion of the truck and brake-lever hanger, taken substantially on the line $x\ x$, Fig. 3.

Similar numerals of reference indicate corresponding parts throughout the several views.

Under certain conditions it may be desirable to employ our invention in trucks wherein large and small wheels or wherein the feature of increased traction is not present, and it is obvious that we therefore do not limit ourselves to its employment in maximum or increased traction trucks; but inasmuch as the invention has special application to such class of trucks and produces satisfactory results in its employment thereon we have illustrated the invention in connection with such a truck, which may be constructed as follows:

1 2 in the drawings are respectively the driving axle and wheels, and 3 4, respectively, the trailing axle and wheels, both of the axles being provided with journal-boxes 5 and 6 in the usual manner, the journal-boxes being embraced by yokes or pedestals 7 8, forming part of the side frames 9, either or both of the ends of which may be provided with a cross-bar 10. In the present case the brake-shoes for the driving-wheels being hung from the truck-frame, the employment of a cross-bar 10 or its equivalent is essential, the cross-bar being bolted to the ends of the side frames, as illustrated, or in any other desirable manner, and the shoes for the trailing wheels being hung from the truck-frame on the inside. To so support them, we employ a cross-bar 11, which in this case is made of a flat bar turned edgewise, its ends 12 being bent at an angle, the ends being bolted to the side bars 9, as shown. Such a truck or one otherwise constructed can be employed, the essentials in this regard being merely the means for preserving the parallelism of the axles and wheels and means for hanging the brake-shoes.

The brake mechanism is constructed as follows: To the vertical web 13 of the cross-bar 10 is secured inwardly and upwardly extending hangers 14, provided with an eye and cross-pin 15, from the ends of which, on both sides of the hanger, pivotally depend links 16, the lower ends of the links pivotally engaging a pin 17, which extends through an apertured boss 18 on the head 19 of the brake-shoe 20, which shoe is made longer or on a larger arc than the shoe for the trailing wheels, so that the shoes for both sets of wheels will grip a properly-proportioned amount of surface on the respective treads of their wheels.

Thus far the construction of the brake-shoe and its hanging are old.

Each of the shoes 20 is provided with a rearwardly-extending and apertured boss 22, the shoes being connected transversely by a brake-beam 23, the ends 24 of which are rounded and pass through the aperture in the boss 22, so as to allow of a vibrational movement on the ends of the brake-beam relative to said shoe or the shoe to vibrate thereon, as the case may be, the beam being provided with apertured enlargements 25 intermediate of the shoes for the connection of the brake-rods, as hereinafter described. The shoes 26, which coöperate with the smaller or trailing wheels 4, are supported from the truck-frame on the inside, so as to operate in the same direction of movement as do the shoes 20, and for hanging the shoes like hangers and links are employed as are employed in connection with the shoes 20. At 27 is another brake-beam, which is also provided with journaled ends finding bearings in the apertured bosses 22, and is further provided with apertured enlargements 25 intermediate of the shoes to allow of the passage of the brake-rod therethrough, as hereinafter described.

We employ for operating the brake-rods upright brake-levers 28, which are fulcrumed at their lower ends in outwardly-projecting U-shaped hangers or brackets 29, which are in turn secured to the cross-bar 11, pins 30 passing through the hangers and upright levers to form the fulcra for said levers on the hangers.

The brake power is applied from a windlass or lever on the car (or in any other suitable way) to the upper ends of the brake-levers 28, and in order to provide for the connection of the brake mechanism and the car windlass or lever, &c., we employ by preference a draft-equalizing lever, comprising the transverse and segmental equalizing-bar 31, having ends 32 extending outwardly at an angle thereto, which ends are bifurcated, as at 33, and pivotally secured to the upper ends of the brake-levers 28 by pins 34, the connection between the equalizing-lever and the car-levers, &c., being provided by devices which allow of a movement between said equalizing-bar and said levers, as illustrated in the patent to John A. Brill, No. 503,121, dated August 15, 1893.

The connection between the brake-beams and the brake-levers 28 is made as follows: At 35 are duplicate brake-rods extending longitudinally of the truck between the wheels and at the drive-wheel under the drive-axle 1. The drive-wheel ends of the brake-rods are provided with a check-nut 25$^a$ and an intermediate thread 23$^a$ and pass loosely through the enlargements 25 in the brake-beam 23, the extreme end of the brake-rod being provided with nuts 36$^a$. The other end of each of the brake-rods is bifurcated, thereby forming an upper arm 38 or gooseneck and a lower arm or thrust-bar 39, the upper arm 38 being bifurcated to embrace the brake-lever 28, to which said arm is pivotally secured by means of the pin 40, the lower arm or thrust-bar 39 having two diameters, the beginning and ending of which forms a shoulder 41, Fig. 3, the forward portion of the bar of smaller diameter 42 passing loosely through the apertured enlargements 25 on the brake-beam 27, the larger portion 43 of the thrust-bar being provided with a screw-thread, as is the extension 42, both parts being provided with nuts 44 45, and interposed between the brake-beam 27 and the nuts 44 and about the parts 42 43 of the thrust-bars 39 are spiral springs 46, spring-caps 47 48 being interposed between the respective ends of the spring and the nut 44 and brake-beam 27, the respective parts 42 43 of the arms 39 passing through said caps, the cap 48 especially being movable on the arm 42.

The equalizing-springs, which are combined with the shoes of the driving-wheels, are arranged as follows: To provide for their proper mounting, the brake-rods 35 are formed with extensions 35$^a$, which pass loosely through the enlargements 25 of the beam 23. At 47$^a$ and 48$^a$ are spring-caps or abutments secured loosely on the extensions 35$^a$, the caps 47$^a$ 48$^a$, respectively, abutting against the beam 23 and adjusting-nut 36$^a$, and between the caps and about the extensions 35$^a$ extend spiral springs 46$^a$, the caps having lugs extending into the springs, as shown. It is preferred that the springs 46$^a$ should be more powerful—that is, to offer greater resistance to the application of the shoes—than the springs 46, and the former springs are therefore shown in Fig. 2 as having a greater diameter than the latter, although they may be of any desired diameter. By these means the braking power applied to both sets of wheels can be apportioned to the particular work to be accomplished.

The operation is as follows: While at rest, we prefer that the shoes 20 shall lie farther away from the face of the wheels 2 than do the shoes 26 from the wheels 4, (this being attained by adjustment of either or both of the nuts 36$^a$ or 45,) and when power is applied to the upper end of the brake-levers 28 they will be vibrated toward the smaller wheels, pulling, through the connection 35 38, the shoes 20 toward the face of the wheels 2. At the same time and before the shoes 20 have impinged against the tread of the wheels 2 the shoes 26 will have been brought to bear on the tread of the wheels 4. The shoes 26 having found a bearing against the wheels 4, a continuation of the movement of the shoes 20 toward the wheels 2 will force the springs 46 forcibly through the arm 39 against the brake-beam 27 with constantly-increasing force as the movement in the same direction of the lever 28 continues, compressing the springs and separating the nuts 45 from contact with the brake-beam 27. This is followed by a compression to the desired extent of the springs 46$^a$ during the application of the shoes 20 to the wheels 2, and when the shoes 20 are under full or desired pressure on the wheels 2 the shoes 26 are under a pressure bearing the proportion to that exerted on the wheels 2 which may be desired, the greater pressure as the mechanism is arranged herein being on the larger wheels and less on the smaller wheels. It is preferred that the tension of the springs 46$^a$ is to be so adjusted that they will not be at the limit of their compression when the shoes 20 find a bearing on the tread of the wheel under ordinary braking pressure. The springs 46$^a$ being of greater resistance than the springs 46, the effective resistance of either of the sets of springs can be regulated to allow of a greater pressure being applied to the driving-wheels than the trailing wheels.

It is obvious that by adjusting the resiliency of the springs 46 less pressure can be exerted upon the wheels 4 than is exerted upon the wheels 2 and that this adjustment can be in a measure obtained by moving the nut 44 on the part 43 of the arm 39 so as to compress or relax the springs 46, or such springs may, if desired, be of such a character as to be able to sufficiently resist the movement of the arms 39 against the brake-beam, so as to allow of the same degree of power which may be exerted upon the wheels 2 to be exerted upon the wheels 4, and by placing a weaker spring or by otherwise varying the resistance interposed by the springs varying pressure can be brought to bear upon the wheels 4, and in the same manner the springs 46$^a$ can be adjusted or substituted by springs of a different capacity to allow of a variation of the pressure applied to the large wheels in proportion to that of the smaller wheels or to make the pressure the same on both wheels.

The nut 45, which is movable upon the extension 42, forms an abutment for the brake-beam to bear against during the pushing of the shoes to the treads of the wheels and by means of which the time of application of the shoes 26 to the wheels 4 as compared with that of shoes 20 to wheels 2 can be regulated or adjusted, and the adjustment can be made which will allow of both sets of shoes being applied simultaneously or the shoes 20 before the shoes 26, as desired.

The enlargements 43 of the arms 39 support the springs 46 free from wabbling, and the shoulder 41, formed at the point of union of the parts 42 43, serves as a safety medium, which will insure the application of the brake-shoes 26 to the wheels 4 should the connection with the brake-shoes 20 break out or become damaged or the springs 46 be broken or omitted, in which events the shoulder, provided sufficient play of the car-levers permits, will impinge against the brake-beam 27 and apply the brake-shoes 26 to the wheels 4.

One of the advantageous results flowing from the employment of our invention is that it reduces the flattening of the tread of the small wheels due to the sliding of the wheels on the track while the brake is on, which is a very frequent occurrence, owing to the heavy pressure applied to brake cars in modern street traffic, as the springs 46 46$^a$ will yield sufficiently and intermittently to the power of the sliding wheel to release it and grip it again, thereby allowing of a partial rotation of the wheel and consequent changing of the surface of the wheel exposed to the rail.

We do not intend to limit ourselves to the exact construction shown, as the invention can be embodied in other structures; nor do we limit ourselves to the employment of the mechanism herein described to trucks of the large and small wheel or maximum traction class, as it is obvious that the device can be applied to the usual class of trucks. It is further apparent that in some cases the springs 46 (the springs 46$^a$ being retained) may be omitted and the shoes 26 applied through the medium of the shoulder 41 or some equivalent device.

Having described our invention, we claim—

1. In a brake mechanism for a truck of the maximum traction class having large and small wheels, and means for differentiating the brake-pressure exerted upon the large and small wheels, comprising shoes, and connecting-beams therefor for each of the sets of wheels, a primary lever supported on the truck, a connection between the primary lever and the shoes for the small wheels, whereby said shoes are applied to said wheels through the operation of said lever, a movable connection between said primary lever and the shoes of the large wheels, and a spring or springs interposed in the last-mentioned connection to oppose the application of pressure to said larger wheels, substantially as described.

2. In a brake mechanism for a truck of the maximum traction class having large and small wheels, of means for applying a differentiating braking pressure on the large and small wheels, comprising shoes and connecting-beams for each of the sets of wheels, a primary lever supported on the truck, a movable connection between said lever and the beam of the large-wheel shoes, a spring or springs interposed between said movable connection and beam, and an inflexible arm leading from said lever to the beam of the small-wheel shoes, substantially as described.

3. In a brake mechanism for a truck of the maximum traction class having large and small wheels, and means for differentiating the brake-pressure exerted upon the large and small wheels, comprising shoes, and connecting-beams therefor for each of the sets of wheels, a primary lever supported upon the truck, a movable connection between the primary lever and the shoes of the large wheels, a spring or springs interposed in this connection, a movable connection between said primary lever and the shoes of the small wheels and a spring or springs interposed in the latter connection, the spring or springs for the large-wheel shoes being of a greater resisting capacity, substantially as described.

4. In a brake mechanism for a truck of the maximum traction class having large and small wheels, of means for applying a differentiating braking pressure on the large and small wheels, comprising shoes and connecting-beams for each of the sets of wheels, a primary lever supported on the truck, a movable connection between said lever and the beam of the large-wheel shoes, a spring or springs interposed in said connection, an inflexible arm leading from said lever to the beam of the small-wheel shoes, and a spring or springs interposed between said arm and latter beam, the spring or springs for the large-wheel shoes being of a greater resisting capacity, substantially as described.

5. The combination with a truck of the maximum traction class having large and small wheels, of the brake mechanism comprising a primary lever pivoted on the truck, brake-shoes, of beams for connecting the shoes in pairs, a rod movably connecting said primary lever and the shoe-beam for the large wheels, a spring or springs interposed in said connection, a supplemental rod between the first-mentioned rod and the shoe-beam for the small wheels and movably connected with said latter beam, both rods moving in the same direction, a spring or springs between the supplemental rod and its beam, and an abutment on said supplemental rod on the other side of the beam, substantially as described.

6. In combination with a car-truck having paired large and small wheels, of a brake mechanism therefor, said mechanism comprising paired shoes and means for operating them, springs initially of different resisting capacity opposing the application of each of the pairs of shoes to each pair of said wheels, and further means for adjusting the capacity of said springs, substantially as described.

7. In combination with a car-truck having large and small wheels, of a brake mechanism therefor, said mechanism comprising shoes and means for operating them, springs for opposing the application of the shoes to the smaller wheels, and further springs of a greater resisting capacity for opposing the application of the shoes to the larger wheels, substantially as described.

8. In combination with a truck having large and small wheels, of a brake mechanism therefor, said mechanism comprising paired shoes, beams for each set of shoes, brake-rods, a spring interposed between the rod and shoes for the smaller wheels, and a spring of greater resisting capacity interposed between the rod and shoes for the large wheels, substantially as described.

9. In combination with a truck having large and small wheels, of a brake mechanism therefor, said mechanism comprising paired shoes, beams for each set of shoes, rods passing loosely through said beams and extending therefrom in the same direction, abutments on the rods, heavier springs on the rods between said abutments and the shoes for the larger wheels, and lighter springs likewise located in reference to the smaller wheels, the springs and beams being thereby adapted be to moved in the same direction to apply the shoes and compress the springs, substantially as described.

10. In a brake mechanism, the combination with the shoes paired in sets, operating brake-rods, a spring or set of springs of one resisting capacity opposing the application of one set of shoes to one set of wheels, and another spring or set of springs of greater resisting capacity opposing the application of the other set of shoes to the other set of wheels, substantially as described.

11. In a brake mechanism, the combination with the shoes paired in sets, a brake-beam for each of the sets of shoes, brake-rods movably engaging said beams, a spring or set of springs of one resisting capacity opposing the application of one set of shoes to one set of wheels, and another spring or set of springs of greater resisting capacity opposing the application of the other set of shoes to the other set of wheels, substantially as described.

12. In combination with a car-truck having large and small wheels, of a brake mechanism having shoes paired in sets, operating brake-rods, springs of variable capacity opposing the action of the shoes, and means for varying the capacity of said springs, the springs for the large wheels being of greater capacity, substantially as described.

13. In a car-truck, the combination with paired wheels, of a brake mechanism therefor comprising brake-beams and paired shoes, and means for operating them, consisting of paired rods connected to one of said brake-beams, and having rigid branches connected to another brake-beam, abutments on said branches, and springs interposed between said abutments and one side of the corresponding brake-beam, substantially as described.

14. The combination in a brake mechanism of a pair of movable brake-beams, brake-shoes moved by said brake-beams, a pair of rods connected with one of said brake-beams and having branches connected with another brake-beam, abutments on said rods and springs interposed between said abutments and corresponding sides of both of said beams, said springs resisting the application of the brake-shoes, operating means working in unison and connection between said operating-levers and said rods, substantially as described.

15. The combination in a brake mechanism of movable brake-beams and brake-shoes carried thereby, rods passing through bearings on one of the said brake-beams, and having branches passing through bearings on another brake-beam, abutments on said rods on opposite sides of said bearings, springs resisting the application of the brake-shoes interposed between one set of such abutments and the corresponding sides of both brake-beams; and means connected to the said rods for operating the latter and the brake-beams in unison, substantially as described.

16. In a railway-brake, the combination of a pair of brake-beams provided with shoes, a brake-lever, a spring connection between one of the brake-beams and the brake-lever, and a spring connection of greater tension located between said lever and the other brake-beam, substantially as described.

17. In a brake apparatus, the combination with the truck side frames and the wheels, of the cross-bar, levers fulcrumed on the cross-bar, opposing brake beams and shoes, brake-rods connected to said levers and movably engaging said brake-beams, an equalizing connection of said levers with the source of power, and springs of different resisting capacity through the medium of which brake-pressure is applied to each of the pairs of shoes for the pairs of said wheels, substantially as described.

18. In a truck-brake apparatus, the combination with the wheels, of a floating equalizing-bar, a brake-beam and paired shoes at one end of the truck, a brake-beam and paired shoes at the opposite end of the truck, an upright brake-lever, connections between said lever and the former brake-beam, and said lever and the latter brake-beam, and springs interposed in said connections, the equalizing-bar being adapted to move the former brake-beam in the direction of movement of said bar, substantially as described.

19. In a brake mechanism for a truck having large and small wheels, means for exerting differential brake-pressure upon the large and small wheels, comprising shoes, connecting-beams for the shoes of each of the sets of wheels, a lever supported on the truck, a connection between the lever and the shoes for one of the sets of wheels whereby the said shoes are applied to said wheels through the operation of said lever, a movable connection between said lever and the shoes of the other set of wheels, and a spring or springs interposed in said last-mentioned connection through which pressure is applied to said last-named wheels, substantially as described.

20. In combination with a car-truck having paired large and small wheels, of a brake mechanism therefor, comprising paired shoes and means for operating them, and springs of different resisting capacity through the medium of which brake-pressure is applied to each of the pairs of shoes for the pairs of said wheels, substantially as described.

21. In combination with a car-truck having large and small wheels, a brake mechanism having shoes paired in sets, operating brake-rods, springs of variable capacity through which the action of the shoes is controlled, and means for varying the capacity of said springs, substantially as described.

22. In combination with a truck having large and small wheels, of a brake mechanism therefor, said mechanism comprising paired shoes, beams for each set of shoes, rods passing through said beams, abutments on the rods, heavier springs on the rods between said abutments and the shoes for the larger wheels, and lighter springs likewise located in reference to the smaller wheels, substantially as described.

23. In a brake apparatus, the combination with the truck, of the truck-frame and the wheels, the cross-bar, a lever fulcrumed on the cross-bar, opposing brake beams and shoes, brake-rods connected to said lever and movably engaging said brake-beams, and springs of different resisting capacity through the medium of which brake-pressure is applied to each of the pairs of shoes for the pairs of said wheels, substantially as described.

24. In a brake mechanism for a truck of the maximum traction class having large and small wheels, of means for applying a differentiated braking pressure on the large and small wheels, comprising shoes, and connecting-beams for one of the sets of wheels, a primary lever supported on the truck, an inflexible connection between said lever and the beam of the large-wheel shoes, an abutment on said connection beyond said beam, a resilient element interposed between said abutment and said beam, an inflexible arm leading from said lever to the beam of the small-wheel shoes, and a resilient element interposed between said arm and latter beam, substantially as described.

25. The combination with a truck of the maximum traction class having large and small wheels, of a brake mechanism comprising a primary lever pivoted on the truck, brake-shoes, of beams for connecting the shoes in pairs, a rod connecting said primary lever and the shoe-beam for the large wheels, between which rod and beam a spring is interposed, a supplemental rod between said first-mentioned rod and the shoe-beam for the small wheels, the rods being movably connected to both beams, both rods moving in the same direction, a spring between the supplemental rod and its beam, and an abutment on said supplemental rod on the other side of the beam, substantially as described.

26. The combination with the brake-shoes, of the beams connecting the shoes in pairs, an operating-lever, a brake-rod extending between said beams and movably engaging both of said beams, a connection between the rod and said lever, and springs interposed between both of said beams and said rod to oppose the application of the paired shoes to the wheels, substantially as described.

27. In a brake mechanism, the combination with the shoes and beams connecting said shoes in pairs, with the primary lever fulcrumed at its end, rods extending between one of said beams and secured to said primary lever between its power end and fulcrum, springs between said rod and said beam, a thrust-bar operated by said lever, and a spring or springs interposed between said thrust-bar and the opposing beam, said bar and beam having a movable connection, substantially as described.

28. In a truck-brake mechanism, the combination with the shoes adapted to be moved in the same direction, opposing beams connecting the shoes in pairs, one of said beams being located between the wheels, the other outside of the wheels, a brake-rod passing loosely through the beams, means for moving the rod, abutments on the rod, one of the abutments being between the wheels and the other outside of the wheels, and springs between each of the beams and each of said abutments, substantially as described.

29. The combination with the shoes and beams, of the upright lever fulcrumed at its end upon the car-truck, the inflexible brake-rod secured to one beam at one end and to the primary lever at its other end between the power end and fulcrum of said levers, a spring interposed between said brake rod and beam, an extension of said rod movably engaging the other beam, an abutment on said extension, and a spring between said abutment and said beam, substantially as described.

30. The combination with the shoes, and beams connecting them, with the primary lever, the brake-rod extending between one of the said beams and pivotally secured to said lever, a spring interposed between said brake rod and beam, an extension of said rod movably engaging the other beam, an abutment on said extension, a spring interposed between said abutment and said beam, and an abutment on said extension for said beam, substantially as described.

31. The combination of the primary lever, the shoes and the beams connecting said shoes in pairs, a rod extending between one of said beams and said primary lever, an extension of said rod movably connected with the other beam, and springs interposed between the connection of the rod and the former beam and the extension of said rod and the latter beam, substantially as described.

32. In a brake system, the combination of the brake-shoes, beams, and operating means therefor, of the brake-rod resiliently connected at one end with one beam, and at the other with said operating means, and an extension from said rod resiliently connected with another beam of said system, substantially as described.

33. The combination of the primary lever, the shoes, and beams connecting said shoes in pairs, rods extending between one of said beams and said primary lever, the abutment $48^a$, springs between said abutment and said beam, and an extension of said rod movably connected with the other beam, a spring on said extension, one of which abuts against said beam, and the nuts 44, 45 respectively, forming an adjustable abutment for said latter spring and beam, substantially as described.

34. The combination with the cross-bar 11, the hanger 29 extending therefrom, upright lever 28 fulcrumed at its end to said hanger, the brake-shoes 20 and connecting-beam 23, the shoes 26 and connecting-beam 27, a hanger for supporting the last-mentioned shoes from said cross-bar, a brake-rod 35 extending through the beam 23 at one end, the extension $35^a$ of which carries the spring $46^a$, an abutment $48^a$ for the spring, said brake-rod having a bifurcated end 38, 39, the arm 38 being secured to said brake-lever adjacent the latter's fulcrum, the lower arm 39 movably engaging the beam 27, an abutment on said arm 39, and a spring interposed between said abutment and said beam, substantially as described.

35. The combination of the shoes 20 and beam 23, the upright lever 28, the equalizing-bar 31, and extensions 32 pivotally secured to the upper end of said upright lever, forked rods each of which is secured at one end to the beam 23, the upper fork of each of said rods being secured to one of said upright levers above the latter's fulcrum, the lower fork movably engaging the beam 27, an abutment on the said lower fork, a spring between said abutment and beam, and a spring between the ends of said rods and the beam 23, substantially as described.

36. In a brake mechanism, the combination with the primary lever, the paired shoes and connecting-beams, of a rod having a direct connection with one of said beams, and a spring or springs of greater resisting capacity interposed between said beam and rod, a further connection of said rod with the other beam, and a spring or springs of lesser resisting capacity interposed between said connection and latter beam, substantially as described.

Signed in the city and county of Philadelphia, State of Pennsylvania, this 14th day of September, 1897.

JOHN A. BRILL.
WALTER S. ADAMS.

Witnesses:
R. S. REED,
CHARLES KANE.